UNITED STATES PATENT OFFICE.

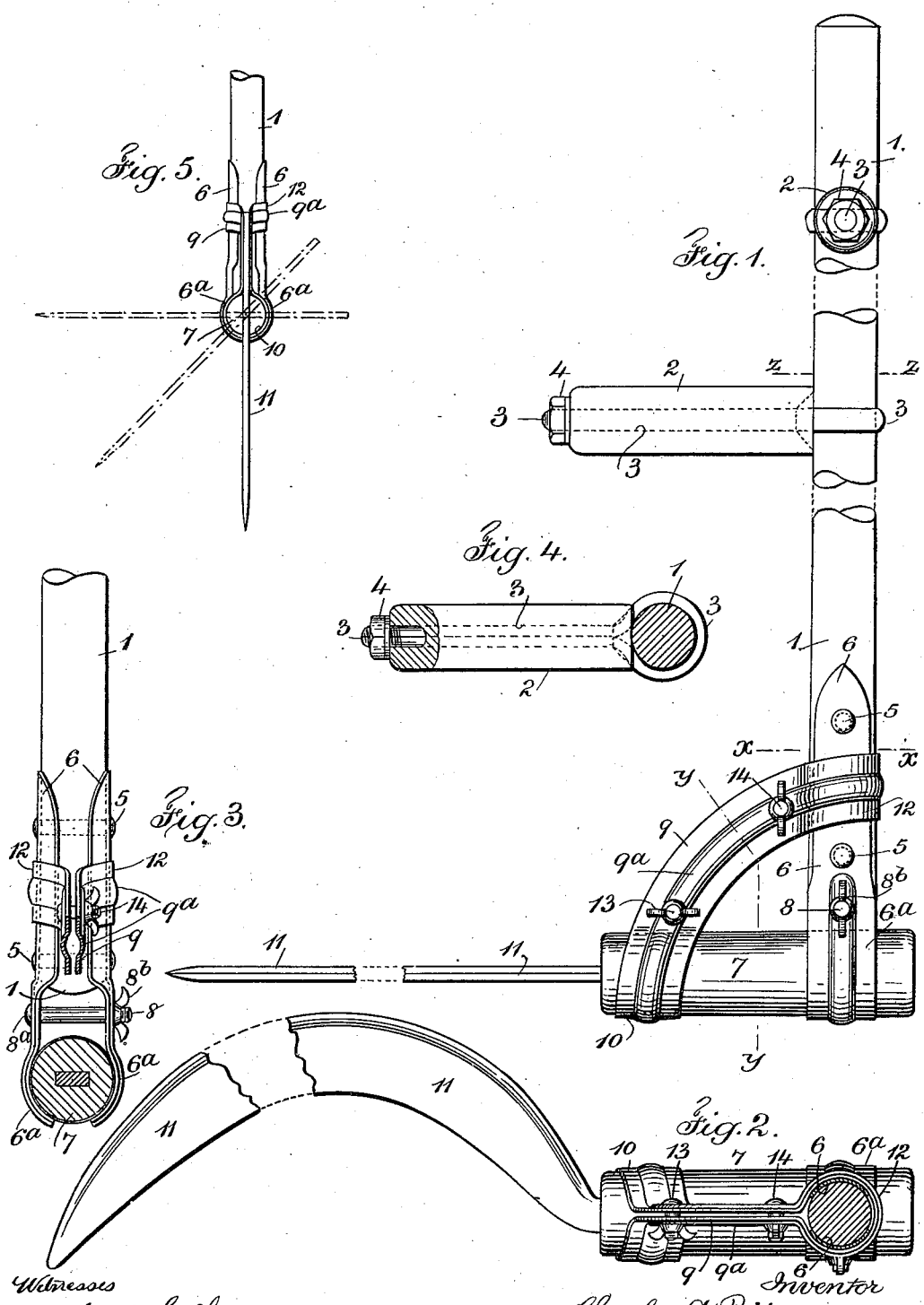

CHARLES A. REITMEYER, OF FREEPORT, NEW YORK.

IMPLEMENT FOR HOLDING GRASS-HOOKS OR SICKLES.

980,007.  Specification of Letters Patent.  Patented Dec. 27, 1910.

Application filed March 8, 1910. Serial No. 548,102.

*To all whom it may concern:*

Be it known that I, CHARLES A. REITMEYER, a citizen of the United States, residing at Freeport, in the county of Nassau and State of New York, have invented certain new and useful Improvements in Implements for Holding Grass-Hooks or Sickles, of which the following is a specification.

My invention relates to an implement for holding an ordinary grass-hook or sickle, and the object of the invention is to provide as such implement, a snathe or handle which can be detachably and adjustably secured to the ordinary handle of a grass-hook or sickle, so that the necessity of stooping or crouching down when using the hook or sickle in cutting grass is avoided, while it permits of the grass hook being used in the ordinary manner when desired, by simply detaching it from the snathe.

In carrying out my invention, I provide a snathe or handle having hand-grips adjustably connected thereto. Secured to the snathe at or near its lower end and oppositely placed, are a pair of clamping plates which extend below the end of the snathe and terminate in curved jaws adapted to grasp or partially encircle the common handle of the grass-hook or sickle and to be clamped thereon by a suitable clamping screw. I further provide a brace, one end of which is adapted to adjustably encircle the snathe and the clamping plates thereon and to be clamped thereto, while the other end of the brace terminates in a pair of clamping jaws by which that end of the brace is detachably connected with the handle of the common grass-hook.

In the accompanying drawing, Figure 1 is an elevation with portions of the snathe and cutting blade removed. Fig. 2 is a sectional plan below the dotted line $x, x$, of Fig. 1. Fig. 3 is an elevation and section at the dotted line $y, y$, Fig. 1. Fig. 4 is a section through the snathe at the dotted line $z, z$, Fig. 1, showing one of the hand-grips partially in section, and Fig. 5 is a diagrammatic elevation illustrating some of the positions in which the cutting blade of the sickle may be adjusted.

Similar numerals of reference indicate corresponding parts in the several views.

The snathe or long handle 1 is provided with hand-grips 2. These grips 2 are preferably of wood with a central longitudinal opening to receive the split bolt 3. These bolts 3 are screw-threaded at their outer ends to receive the nut 4, while at the other ends a loop is formed which encircles the snathe 1 and it will be readily seen that the grips 2 can be securely clamped to the snathe in any position desired by means of these split bolts 3 and nuts 4.

At or near the lower end of the snathe 1 and secured thereto by rivets 5 or other suitable means, I provide two oppositely placed resilient or yieldable clamp-plates 6, curved to conform to the shape in cross-section of the snathe 1 and so to closely fit thereon. These clamp plates 6 each extend below the lower end of the snathe, and at their lower portions are bent to form oppositely disposed resilient jaws $6^a$ which are adapted to partially encircle the handle 7 of the grass-hook or sickle and are clamped thereon by the bolt 8 which passes through alined openings in each plate 6 at a predetermined distance below the end of the snathe 1. One end of this bolt 8 is provided with a head $8^a$ and the other end is screw-threaded and receives the thumb nut $8^b$ by means of which the jaws $6^a$ can be readily clamped to the handle 7 or released therefrom.

The curved brace 9 is preferably made of one piece of spring metal of a suitable width and thickness, and if desired, it may be made with an integral rib $9^a$ to give additional strength and stiffness. This brace 9 is formed with a loop 12 or equivalent jaws adapted to encircle the snathe 1 and the clamping plate 6 thereon, while the lower end terminates in a pair of clamping jaws 10 at right angles to the loop portion 12 and which jaws 10 are adapted to encircle, or partially so, the handle 7 of the cutting blade 11 and be clamped thereon by the clamping bolt 13. I also provide a clamping bolt 14 by which the looped portion 12 of the brace 9 may be tightly clamped to the snathe 1 over the plate 6 after it has been placed in position.

The adjustability of the jaws $6^a$ on the snathe 1 and of the jaws 10 on the brace 9 with respect to and around the handle 7, permits the sickle to be turned therein so as to bring the cutting blade 11 into different angles and thereby accommodate the sickle for different circumstances or positions of use, or requirements of the user.

The brace 9 not only forms an additional fastening for the snathe 1 to the grass-hook handle 7, but greatly relieves the snathe of torsional strain thereon, and the handle 7 being firmly gripped in two places, there is no liability of its turning within the jaws of the clamp until they are intentionally released. This brace 9 is capable of a limited movement longitudinally of the snathe to further facilitate the adjustable position of the sickle.

It will be understood that my invention may be applied to any of the common or ordinary forms of grass-hook or sickle without altering or changing the same in any manner whatever, and that it can also be readily detached therefrom to permit of the grass-hook being used in the ordinary manner when desired.

I claim as my invention:

1. An implement for adjustably holding a grass hook or sickle by its handle for use, comprising a snathe adapted to be grasped by the hand, a pair of oppositely positioned clamp plates securely fastened to the lower end of the snathe and extending below the same and terminating in curved resilient jaws to receive and partially encircle the handle of the grass hook, and means located between the lower end of the snathe and the said jaws and acting to draw said jaws toward one another for clamping the latter upon the handle of the grass hook.

2. An implement for adjustably holding a grass hook or sickle by its handle for use, comprising a snathe to be grasped by the hand, plate members secured to the lower end of the snathe and prolonged and terminating in means adapting said parts to receive the said handle, clamping means for engaging said parts, a detachable brace extending from the lower end of the snathe at said plate members to and also engaging the said handle, and means at both ends of the brace for clamping the same in position.

3. An implement for adjustably holding a grass-hook or sickle by its handle for use, comprising a snathe, a pair of oppositely positioned clamp plates secured to the lower end of the snathe and extending below the same and terminating in curved jaws to receive and partially encircle the handle of the grass-hook, means for clamping said curved jaws to the handle of the grass-hook, a brace detachably secured to the snathe at one end and provided with jaws at the other end adapted to receive the handle of the grass-hook, and means for clamping the same thereon.

4. An implement for adjustably holding a grass-hook or sickle by its handle for use, comprising a snathe, a pair of clamp plates secured to the lower end of the snathe in opposite positions and extending below the same and terminating in curved jaws to receive and partially encircle the handle of the grass-hook, means for clamping said curved jaws to the said handle, a brace, means for clamping the brace to the snathe at one end, said brace being provided with jaws at its other end to receive the handle of the grass-hook, and said brace having ribs at their free ends with alined openings therein, a bolt passing through said openings, and a thumb nut upon said bolt for clamping the said jaws upon the said handle.

5. An implement for adjustably holding a grass-hook or sickle by its handle for use, comprising a snathe, a pair of clamp plates secured to the lower end of the snathe in opposite positions and extending below the same and terminating in curved jaws to receive and partially encircle the handle of the grass-hook, means for clamping said curved jaws to the said handle, a curved brace formed of one piece of spring metal with a loop at one end and a pair of jaws at the other and free end, said loop portion encircling the snathe and the clamp plates thereon, and said jaws receiving and encircling the handle of the hook, means for clamping said jaws upon the said sickle handle and for clamping the said looped portion upon the snathe around the clamp plates thereon.

Signed by me this 2d day of March, 1910.

C. A. REITMEYER.

Witnesses:
JENNIE M. REITMEYER,
GEO. T. PINCKNEY.